US012555215B2

United States Patent
Iwata et al.

(10) Patent No.: US 12,555,215 B2
(45) Date of Patent: Feb. 17, 2026

(54) VIDEO DATA COLLECTION AND ANALYSIS DEVICE

(71) Applicant: Mitsubishi Electric Corporation, Tokyo (JP)

(72) Inventors: Masao Iwata, Tokyo (JP); Takuya Kono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 313 days.

(21) Appl. No.: 18/269,472

(22) PCT Filed: Jan. 27, 2021

(86) PCT No.: PCT/JP2021/002707
§ 371 (c)(1),
(2) Date: Jun. 23, 2023

(87) PCT Pub. No.: WO2022/162753
PCT Pub. Date: Aug. 4, 2022

(65) Prior Publication Data
US 2024/0062352 A1    Feb. 22, 2024

(51) Int. Cl.
*G06T 7/00*    (2017.01)

(52) U.S. Cl.
CPC .. *G06T 7/0002* (2013.01); *G06T 2207/10016* (2013.01); *G06T 2207/30168* (2013.01);
(Continued)

(58) Field of Classification Search
CPC . G06T 2207/10016; G06T 2207/30168; G06T 2207/30184; G06T 2207/30252
(Continued)

(56) References Cited

U.S. PATENT DOCUMENTS

| 2021/0303883 A1 | 9/2021 | Jumonji et al. |
| 2022/0270376 A1 | 8/2022 | Jumonji et al. |

FOREIGN PATENT DOCUMENTS

| JP | 2018-198004 A | 12/2018 |
| JP | 2020-107291 A | 7/2020 |

(Continued)

OTHER PUBLICATIONS

Vora, Ayush, Leon Reznik, and Igor Khokhlov. "Mobile road pothole classification and reporting with data quality estimates." 2018 Fourth International Conference on Mobile and Secure Services (MobiSecServ). IEEE, 2018. (Year: 2018).*
(Continued)

*Primary Examiner* — Jonathan S Lee
(74) *Attorney, Agent, or Firm* — Sughrue Mion, PLLC

(57) ABSTRACT

A video data collection and analysis device according to the present disclosed technology includes: a sensor value input interface to acquire a sensor value for a vehicle from a sensor mounted on the vehicle; a video input interface to acquire a outside-vehicle-video obtained by imaging an outside of the vehicle; a vehicle external communicator to communicate with an external server; an abnormality degree evaluator to determine an abnormality degree of a road on which the vehicle travels from a sensor value acquired by the sensor value input interface; an analysis priority determiner to determine a priority in analyzing the outside-vehicle-video on a basis of the determined abnormality degree; and a video analyzer to analyze a road surface condition of a road appearing in the outside-vehicle-video on a basis of the priority.

2 Claims, 6 Drawing Sheets

(52) U.S. Cl.
CPC .............. *G06T 2207/30184* (2013.01); *G06T 2207/30252* (2013.01)

(58) Field of Classification Search
USPC ........................................................ 382/104
See application file for complete search history.

(56) References Cited

FOREIGN PATENT DOCUMENTS

| | | |
|---|---|---|
| JP | 2021-002163 A | 1/2021 |
| WO | 2020/022042 A1 | 1/2020 |

OTHER PUBLICATIONS

Notice of Reasons for Refusal issued Jul. 18, 2023, in Application No. 2022-577849.
International Search Report for PCT/JP2021/002707 dated Mar. 30, 2021.
Office Action issued Aug. 14, 2025 in Chinese Patent Application No. 202180090388.7.

\* cited by examiner

FIG. 5B

Analysis Result Example of Sensor Value

| Point | Sensor | Detection Result | | |
|---|---|---|---|---|
| | | Detection Type | Severity | Reliability |
| A | Acceleration/Gyroscope | Pot Hole | Large | High |
| | Traveling Sound | Pot Hole | Normal | Low |
| | Wheel Speed | Pot Hole | Large | High |
| | Steering Angle, Brake | None | — | — |
| B | Acceleration/Gyroscope | Crack | Large | High |
| | Traveling Sound | Crack | Normal | High |
| | Wheel Speed | Crack | Large | High |
| | Steering Angle, Brake | None | — | — |
| C | Acceleration/Gyroscope | Crack | Small | High |
| | Traveling Sound | Crack | Small | High |
| | Wheel Speed | Crack | Small | High |
| | Steering Angle, Brake | None | — | — |
| D | Acceleration/Gyroscope | Obstacle | Small | Low |
| | Traveling Sound | None | — | — |
| | Wheel Speed | None | — | — |
| | Steering Angle, Brake | Obstacle | Small | High |
| E | Acceleration/Gyroscope | Obstacle | Large | High |
| | Traveling Sound | None | — | — |
| | Wheel Speed | None | — | — |
| | Steering Angle, Brake | Obstacle | Large | High |

VIDEO DATA COLLECTION AND ANALYSIS DEVICE

CROSS REFERENCE TO RELATED APPLICATIONS

This application is a National Stage of International Application No. PCT/JP2021/002707 filed Jan. 27, 2021.

TECHNICAL FIELD

The present disclosed technology relates to a video data collection and analysis device.

BACKGROUND ART

A drive recorder according to the related art acquires a traveling video from a camera, and stores the acquired video in a storage such as an SD. Since the storage has an upper limit of the storage capacity, in a case where recording is performed beyond the storage capacity, the drive recorder ensures the storage capacity by deleting old information.

Recently, it has been studied to detect road surface deterioration, road abnormality, and the like from a traveling video captured by a drive recorder, and upload detected information to an external server using a communication function. In this technical field, for example, Patent Literature 1 discloses a technique of uploading image data while saving communication volume and a band used for communication by performing upload only for image data useful for updating a database generated by a center server.

CITATION LIST

Patent Literature

Patent Literature 1: JP 2018-198004 A

SUMMARY OF INVENTION

Technical Problem

In the conventional technique exemplified in Patent Literature 1, if the processing capability of the video analysis unit is sufficient, the traveling video can be continuously analyzed, but the processing capability of the video analysis unit is not sufficient and may not catch up with the traveling video. If this state continues, the storage capacity of the storage is exhausted, and old information is deleted. There may be important data in the deleted old information.

In view of the above problems, the present disclosed technology has an object to provide a video data collection and analysis device in which important data is not deleted even if information deletion for securing a storage capacity is performed.

Solution to Problem

A video data collection and analysis device according to the present disclosed technology includes: a sensor value input interface to acquire a sensor value for a vehicle from a sensor mounted on the vehicle; a video input interface to acquire a outside-vehicle-video obtained by imaging an outside of the vehicle; a vehicle external communicator to communicate with an external server; an abnormality degree evaluator to determine an abnormality degree of a road on which the vehicle travels from a sensor value acquired by the sensor value input interface; an analysis priority determiner to determine a priority in analyzing the outside-vehicle-video on a basis of the determined abnormality degree; and a video analyzer to analyze a road surface condition of a road appearing in the outside-vehicle-video on a basis of the priority.

Advantageous Effects of Invention

Since the video data collection and analysis device according to the present disclosed technology has the above-described configuration, the priority order of the video to be analyzed is determined from the characteristic of the road abnormality determined on the basis of the sensor information acquired from other than the camera video and the server information, and the analysis is performed in descending order of priority. As a result, the video data collection and analysis device according to the present disclosed technology prevents important video data from being erased even when the processing of the video analysis unit cannot be performed in time.

BRIEF DESCRIPTION OF DRAWINGS

FIGS. 5A and 5B are schematic diagrams illustrating an example of a road abnormality assumed by the video data collection and analysis device according to the present disclosed technology. FIG. 5A is a schematic diagram illustrating a time-series signal of an acceleration sensor corresponding to an abnormality on a road. FIG. 5B is an example of a table in which types of abnormality on a road are associated with analysis results of various sensors.

DESCRIPTION OF EMBODIMENTS

A video data collection and analysis device 1 according to the disclosed technology will be clarified by the following description with reference to the drawings.

First Embodiment

Figure 1:
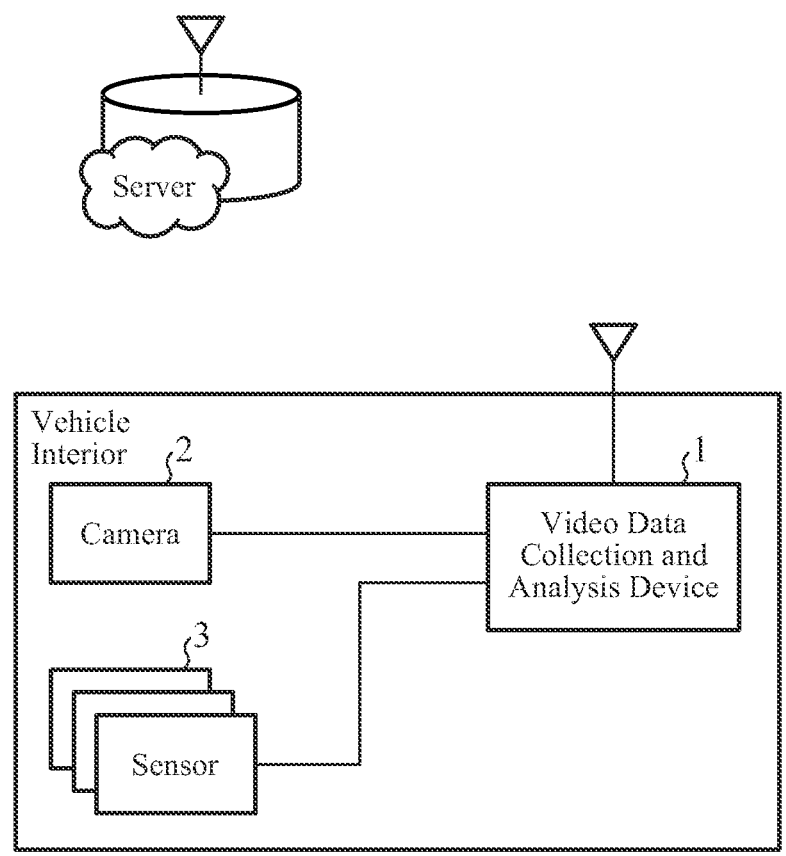
FIG. 1 is a schematic diagram illustrating a configuration example of a video data collection and analysis system including a video data collection and analysis device according to the present disclosed technology.

FIG. 1 is a schematic diagram illustrating a configuration example of a video data collection and analysis system including a video data collection and analysis device 1 according to the present disclosed technology. As illustrated in FIG. 1, the video data collection and analysis system includes the video data collection and analysis device 1 mounted in a vehicle, a camera 2 mounted in the vehicle and imaging the outside of the vehicle, and sensor 3 mounted in the vehicle and detecting various states.

The camera 2 in FIG. 1 is mounted on a vehicle, and images the outside of the vehicle such as the front, the rear, and the left and right. Video images obtained by imaging the outside of the vehicle is hereinafter referred to as "outside-vehicle-video". The sensor 3 in FIG. 1 is mounted on a vehicle, and may include sensors to detect a state of the vehicle, detect surroundings of the vehicle, and obtain time or the like. Examples of the sensor that detects the state of the vehicle include an accelerometer, a gyroscope, a microphone, and a wheel speedometer. Examples of the sensor that detects the surroundings of the vehicle include a corner sensor, a LiDAR, and a laser displacement meter. Other sensors include GNSS and the like.

Figure 2:
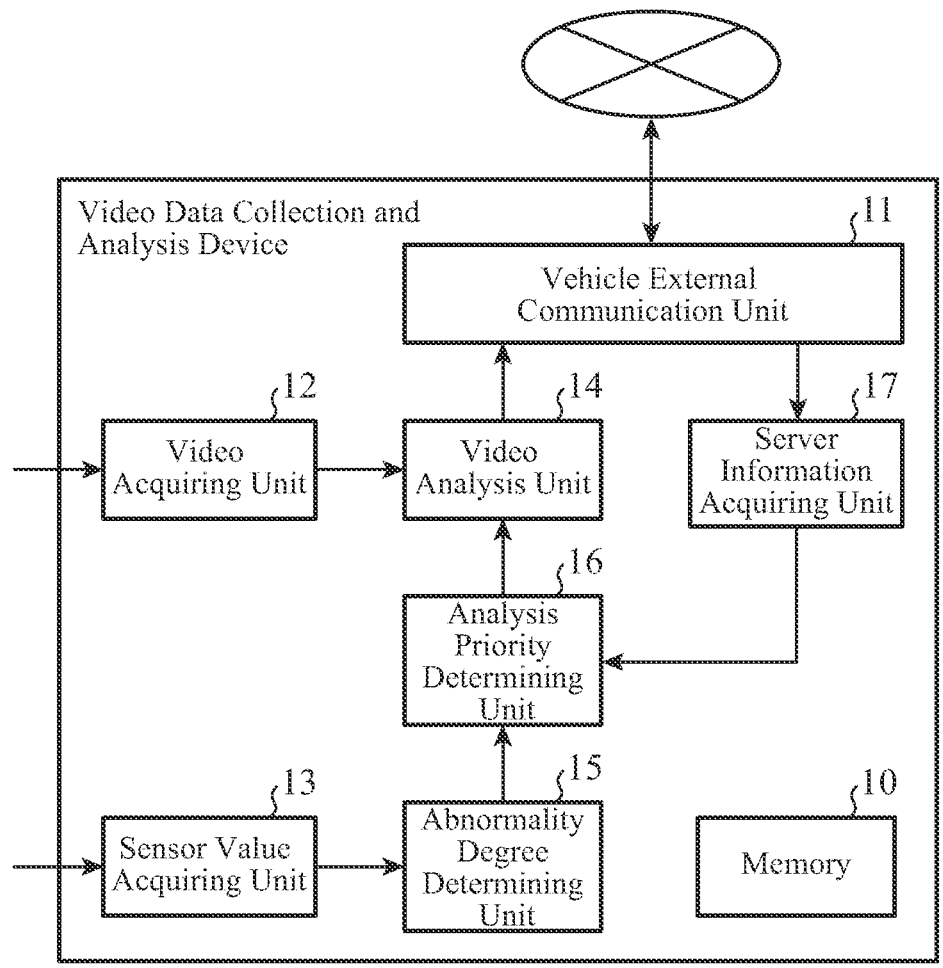
FIG. 2 is a block diagram illustrating functions of the video data collection and analysis device according to a first embodiment.

FIG. 2 is a block diagram illustrating functions of the video data collection and analysis device 1 according to a first embodiment. As illustrated in FIG. 2, the video data collection and analysis device 1 includes a memory 10, a vehicle external communication unit 11, a video acquiring unit 12, a sensor value acquiring unit 13, a video analysis unit 14, an abnormality degree determining unit 15, an analysis priority determining unit 16, and a server information acquiring unit 17.

The memory 10 stores data acquired from the camera 2 and the sensor 3. The vehicle external communication unit 11 communicates various types of information with an external server via a public line and wireless communication such as WiFi. More specifically, the vehicle external communication unit 11 transmits the analysis result transmitted from the video analysis unit 14 to the external server. Further, the vehicle external communication unit 11 transmits server information transmitted from the external server to the server information acquiring unit 17.

The video acquiring unit 12 acquires video data of a outside-vehicle-video transmitted from the camera 2, and transmits the video data to the video analysis unit 14. The sensor value acquiring unit 13 acquires sensor data output from the sensor 3 and outputs the sensor data to the abnormality degree determining unit 15.

The video analysis unit 14 analyzes the video data transmitted from the video acquiring unit 12 and determines the abnormality degree of a road. The video analysis unit 14 proceeds with processing in descending order of the analysis priority according to a priority determined by the analysis priority determining unit 16. Note that the unit of the video data analyzed by the video analysis unit 14 may be a unit of an image frame or a unit of time, or may be a unit set in advance by a user.

The abnormality degree determining unit 15 performs arithmetic processing on the sensor data output from the sensor value acquiring unit 13, and determines the abnormality degree for a road corresponding to the sensor data. Examples of the arithmetic processing on the sensor data include comparison with a threshold, calculation of an average value, calculation of a peak value, calculation of a spectral frequency, and the like. The unit of the video data may be determined by the type of arithmetic processing for the sensor data. Information on the abnormality degree determined by the abnormality degree determining unit 15 is output to the analysis priority determining unit 16.

The analysis priority determining unit 16 determines the analysis priority of each video on the basis of the information on the abnormality degree output from the abnormality degree determining unit 15 and the server information output from the server information acquiring unit 17. The determined analysis priority for each video is output to the video analysis unit 14. The determination of the analysis priority performed by the analysis priority determining unit 16 may be performed in the same unit as the unit of the video data analyzed by the video analysis unit 14, or may be performed in the unit of an image frame or in the unit of time.

The server information acquiring unit 17 outputs the server information transmitted from the vehicle external communication unit 11 to the analysis priority determining unit 16. The server information here includes information such as information indicating which road abnormality is to be preferentially analyzed.

Figure 3:
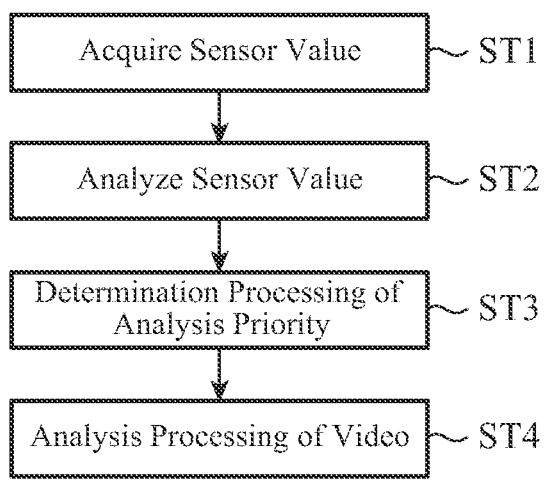
FIG. 3 is a flowchart illustrating a processing flow of the video data collection and analysis device according to the first embodiment.

FIG. 3 is a flowchart illustrating a processing flow of the video data collection and analysis device 1 according to the first embodiment. As illustrated in FIG. 3, the processing of the video data collection and analysis device 1 includes a step (ST1) of acquiring a sensor value, a step (ST2) of analyzing the sensor value, a step (ST3) of determining an analysis priority, and a step (ST4) of analyzing the video data.

The step (ST1) of acquiring a sensor value is a processing step that is performed by the sensor value acquiring unit 13 and acquires, that is, samples sensor data output from the sensor 3.

The step (ST2) of analyzing the sensor value is performed by the abnormality degree determining unit 15, and the degree of abnormality occurring on the road is determined. Here, the abnormality occurring on the road is assumed to be a pot hole, a crack, rutting, a falling object, an obstacle, a human, an animal, or the like.

The step (ST3) of determining the analysis priority is performed by the analysis priority determining unit 16. Details of the step (ST3) of determining the analysis priority will be clarified by the following description.

The step (ST4) of analyzing the video data is performed by the video analysis unit 14. Details of the step (ST4) of analyzing the video data will be clarified by the following description.

Figure 4:
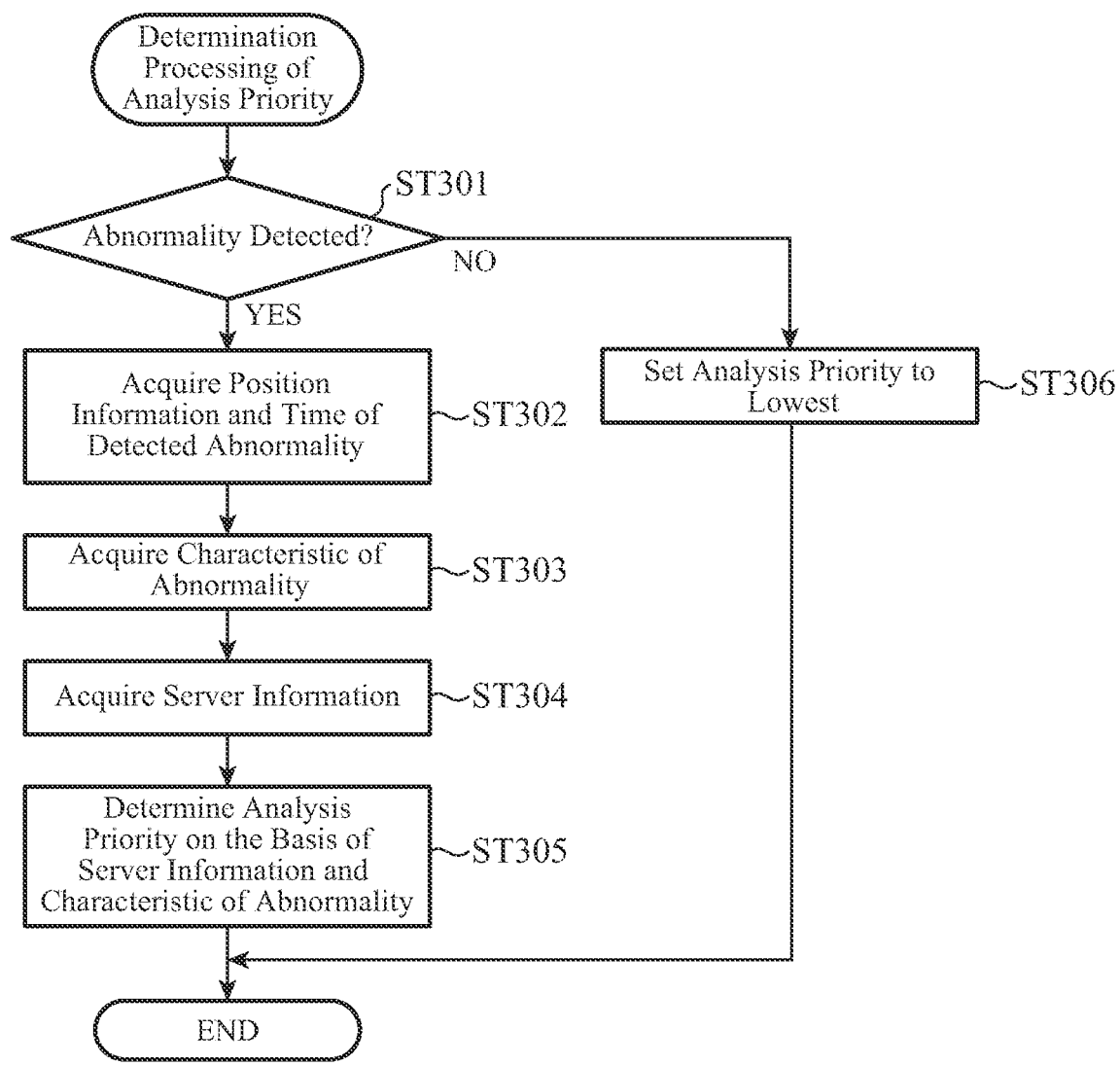
FIG. 4 is a partial flowchart illustrating internal processing in step (ST3) of determining an analysis priority in the flowchart of FIG. 3.

FIG. 4 is a partial flowchart illustrating internal processing in the step (ST3) of determining an analysis priority in the flowchart of FIG. 3. As illustrated in FIG. 4, the step (ST3) of determining the analysis priority includes a step (ST301) of determining the presence or absence of abnormality detection, a step (ST302) of acquiring the position information and the time of the detected abnormality, a step (ST303) of acquiring the characteristic of the abnormality, a step (ST304) of acquiring the server information, a step (ST305) of determining the analysis priority on the basis of the server information and the characteristic of the abnormality, and a step (ST306) of setting the analysis priority to the lowest.

The step (ST301) of determining the presence or absence of abnormality detection is the first step of the step (ST3) of determining the analysis priority, and is performed by the analysis priority determining unit 16. The processing here is performed on the basis of the information on the abnormality degree output from the abnormality degree determining unit 15. If the abnormality degree is lower than the predetermined value, the process proceeds to the step (ST306) of setting the analysis priority to the lowest. Otherwise, the process proceeds to the step (ST302) of acquiring position information and time of the detected abnormality.

The step (ST302) of acquiring the position information and the time of the detected abnormality is an internal step of the step (ST3) of determining the analysis priority, and is performed by the analysis priority determining unit 16. The processing here is processing of acquiring the time when the abnormality degree exceeds the predetermined value and the position information thereof. Note that the video data collection and analysis device 1 according to the present disclosed technology may consider that a target of the video by the camera 2 is a video of a road surface in front of the vehicle on which the present device is mounted. That is, the analysis priority determining unit 16 may consider the delay time between the time when the abnormality is detected and the time when the video is captured by the camera 2 to be associated.

The step (ST303) of acquiring the characteristic of the abnormality is an internal step of the step (ST3) of determining the analysis priority, and is performed by the analysis priority determining unit 16. The processing here is processing of acquiring a characteristic of an abnormality when the abnormality degree exceeds a predetermined value. FIG. 5 is a schematic diagram illustrating an example of a road abnormality assumed by the video data collection and analysis device 1 according to the present disclosed technology. The step (ST303) of acquiring the characteristic of the abnormality will be clarified by the following description along FIG. 5.

Figure 5A:
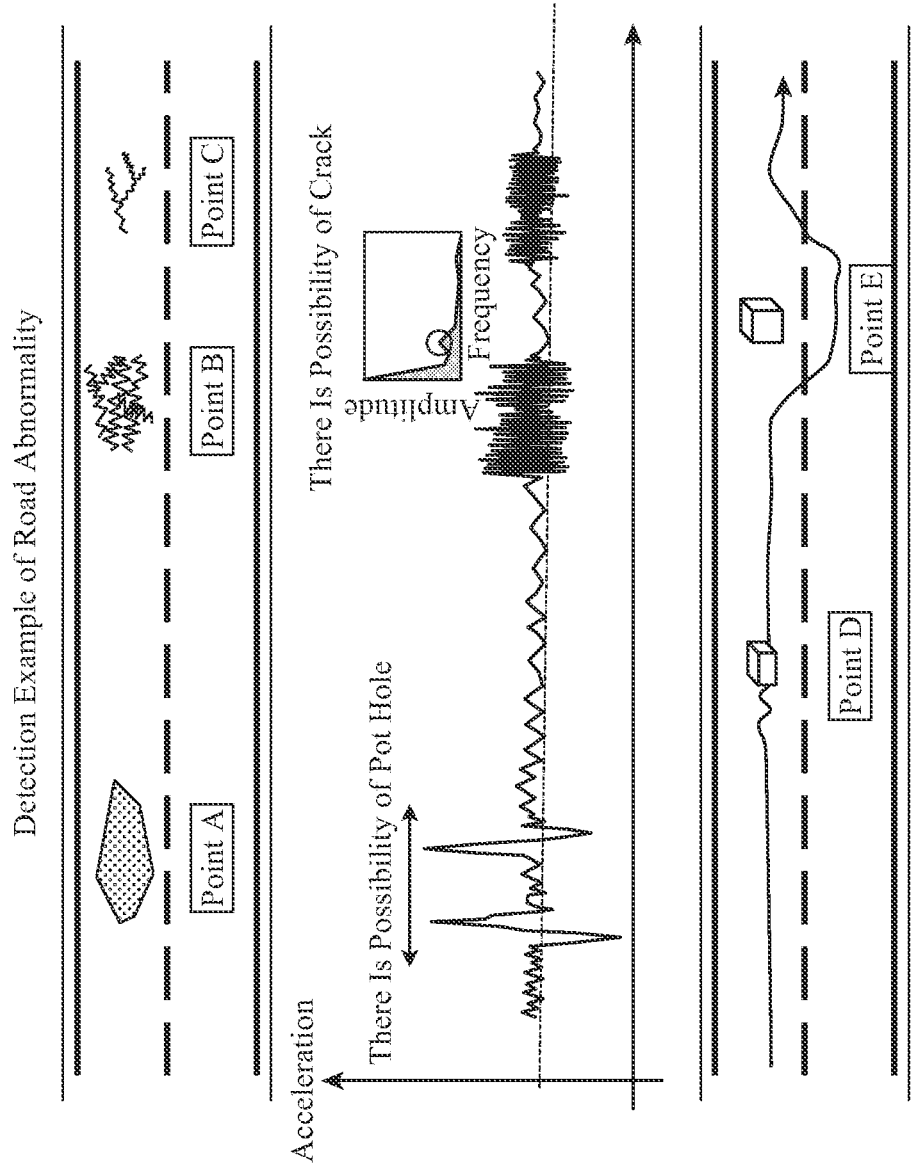

As illustrated in FIG. 5, examples of the road abnormality assumed by the video data collection and analysis device 1 according to the present disclosed technology include a pot hole, a large crack, a small crack, a large obstacle, a small obstacle, and the like. FIG. 5A is a schematic diagram illustrating a time-series signal of an acceleration sensor corresponding to an abnormality on a road. FIG. 5A illustrates that a pot hole and a crack can be detected, for example, by analyzing a time-series signal of an acceleration sensor. In addition, FIG. 5B illustrates that the type of the road abnormality can be determined by observing a characteristic amount obtained from the sensor data of a plurality of types of sensors 3. Here, the characteristic amount may be a peak value of a signal, an interval between peak values, a spectrum frequency, an average value, a maximum value, a minimum value, or the like.

It is assumed that there are N types (N is an integer of 1 or more) in total of the characteristic amounts obtained from the sensor data of the plurality of sensors 3. Then, the road abnormality can be categorized for each type and plotted in an N-dimensional characteristic amount space. Here, it is desirable to also categorize a case of a normal road and plot the case in the N-dimensional characteristic amount space as reference data. The plot information in the N-dimensional characteristic amount space obtained from the past accumulated data can be rewritten into a characteristic amount space map categorized for each type of road abnormality. The characteristic amount space map can derive the type of road abnormality to which the plot belongs with high probability from the plot of the characteristic amount. The video data collection and analysis device 1 according to the present disclosed technology may include a characteristic amount space map created offline. Furthermore, the video data collection and analysis device 1 according to the present disclosed technology may include a learning function, and may include a configuration for updating the characteristic amount space map by learning. Furthermore, a method of deriving a type of a highly probable road abnormality from a plot of the characteristic amount may use a decision tree.

As illustrated in FIG. 5B, the video data collection and analysis device 1 according to the present disclosed technology may set a severity and a reliability for the type of highly probable road abnormality derived from the characteristic amount space map. The severity is a severity of an accident caused by a road abnormality. For example, in the case of a pot hole, the severity is determined by a depth and a width of the pot hole. For example, in the case of an obstacle, the severity is determined by a size of the obstacle. The reliability is determined by, for example, the probability of the type of road abnormality derived from the characteristic amount space map.

The step (ST304) of acquiring the server information is an internal step of the step (ST3) of determining the analysis priority, and is performed by the analysis priority determining unit 16. The processing here is processing of acquiring the server information transmitted from the server information acquiring unit 17. The example of the server information indicates the degree at which the server side desires to acquire the video data for each type of road abnormality. For example, the degree at which the server side desires to acquire video data (hereinafter referred to as "request degree") can be represented by a numerical value of 0 or more and 1 or less. In this example, the higher the priority, the closer to 1, and the lower the priority, the closer to 0.

The step (ST305) of determining the analysis priority on the basis of the server information and the characteristic of the abnormality is an internal step of the step (ST3) of determining the analysis priority, and is performed by the analysis priority determining unit 16. The processing here is processing of determining the analysis priority of the final video data. The information used here is the request degree represented by a numerical value of 0 or more and 1 or less acquired in the step (ST304) of acquiring the server information. As the analysis priority, the request degree may be used as it is. In addition, the severity and the reliability illustrated in FIG. 5B may be used together with the request degree for determination of the analysis priority. The severity and the reliability may also be represented by numerical values of 0 or more and 1 or less, respectively, and the analysis priority of the final video data may be obtained by weighting and multiplying these three numerical values. The weight at this time may be appropriately set by the user.

Figure 6:
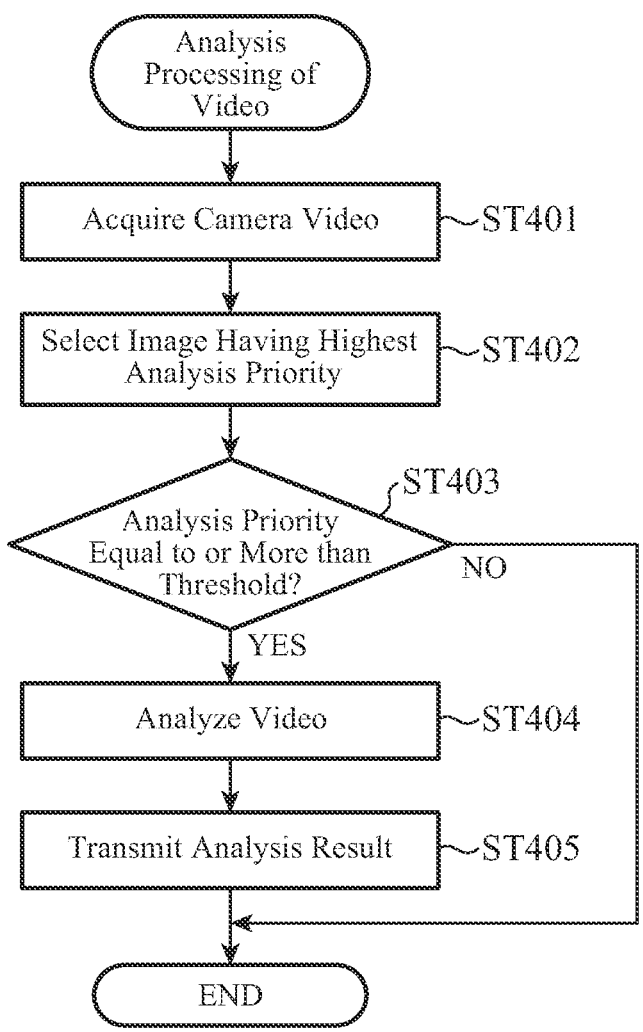
FIG. 6 is a partial flowchart illustrating internal processing in step (ST4) of analyzing the video data in the flowchart of FIG. 3.

FIG. 6 is a partial flowchart illustrating the internal processing in the step (ST4) of analyzing the video data in the flowchart of FIG. 3. As illustrated in FIG. 6, the step (ST4) of analyzing the video data includes a step (ST401) of acquiring a camera video, a step (ST402) of selecting a video having the highest analysis priority, a step (ST403) of determining whether or not the analysis priority is equal to or higher than a threshold, a step (ST404) of analyzing the video, and a step (ST405) of transmitting an analysis result.

The step (ST401) of acquiring the camera video is an internal step of the step (ST4) of analyzing the video data, and is performed by the video analysis unit 14. The processing here is processing of acquiring video data from the camera 2 mounted on the vehicle.

The step (ST402) of selecting the video having the highest analysis priority is an internal step of the step (ST4) of analyzing the video data, and is performed by the video analysis unit 14. The processing here is processing of selecting a video having the highest priority among the analysis priorities determined by the analysis priority determining unit 16 as an analysis target.

The step (ST403) of determining whether or not the analysis priority is equal to or higher than the threshold is an internal step of the step (ST4) of analyzing the video data, and is performed by the video analysis unit 14. The processing here is processing of making a determination on the basis of a certain condition, and the destination of the flow varies depending on the determination result. The condition here is that the analysis priority of the video selected as the analysis target is equal to or higher than a predetermined threshold. When the analysis priority is equal to or higher than the threshold, the processing proceeds to the step (ST404) of analyzing the video. When the condition is not satisfied, the step (ST4) of analyzing the video data for the video is ended.

In the step (ST403) of determining whether or not the analysis priority is equal to or higher than the threshold, the threshold used for the condition is set by considering as follows. Setting the threshold value to 0 has the same meaning as not setting the threshold, and all the videos are analyzed and the ranking analysis of the analysis priority is performed. When the threshold is brought close to 1, the number of videos to be analyzed by the video analysis unit 14 is reduced, which leads to reduction of the load of analysis.

The step (ST 404) of analyzing the video is an internal step serving as a core of the step (ST 4) of analyzing the video data, and is performed by the video analysis unit 14. The processing here is processing of analyzing a video. More specifically, in the step (ST4) of analyzing the video data, the road surface condition of the road appearing in the outside-vehicle-video is analyzed by image analysis. The video analysis unit 14 may use machine learning for image analysis.

The step (ST405) of transmitting the analysis result is an internal step of the step (ST4) of analyzing the video data, and is performed by the video analysis unit 14. The processing here receives the analysis result in the step (ST404) of analyzing the video, and outputs the analysis result and video data to the vehicle external communication unit 11 as necessary. The output analysis result and video data are uploaded to an external server.

As described above, since the video data collection and analysis device 1 according to the first embodiment has the above-described configuration, even when the processing of the video analysis unit 14 cannot be performed in time, important video data is prevented from being erased.

Second Embodiment

The video data collection and analysis device 1 according to the first embodiment has been used in one vehicle, but is not limited thereto. The video data collection and analysis device 1 according to a second embodiment is used in a plurality of vehicles.

A system that achieves one purpose with a plurality of vehicles may be referred to as a connected car system. The video data collection and analysis device 1 according to the second embodiment can be considered as an example of a connected car system.

In the connected car system, each of the plurality of vehicles includes the video data collection and analysis device 1 according to the second embodiment. The video data collection and analysis device 1 according to the second embodiment has a configuration capable of sharing the video analysis results calculated by the respective video data collection and analysis devices 1, the abnormality degree determination results, and the analysis priority determination results via the vehicle external communication unit 11.

With the above configuration, the video data collection and analysis device 1 according to the second embodiment can also be used in a connected car system, and prevents important video data from being erased even when information is shared and processing of the video analysis unit 14 cannot be performed in time.

REFERENCE SIGNS LIST

1: video data collection and analysis device, 2: camera, 3: sensor, 10: memory, 11: vehicle external communication unit, 12: video acquiring unit, 13: sensor value acquiring unit, 14: video analysis unit, 15: abnormality degree determining unit, 16: analysis priority determining unit, 17: server information acquiring unit

What is claimed is:

1. A video data collection and analysis device, comprising:
a sensor value input interface to acquire a sensor value for a vehicle from a sensor mounted on the vehicle;
a video input interface to acquire an outside-vehicle-video obtained by imaging an outside of the vehicle;
a vehicle external communicator to communicate with an external server;
an abnormality degree evaluator to determine an abnormality degree of a road on which the vehicle travels from a sensor value acquired by the sensor value input interface;
an analysis priority determiner to determine a priority in analyzing the outside-vehicle-video on a basis of the determined abnormality degree; and
a video analyzer to analyze a road surface condition of a road appearing in the outside-vehicle-video on a basis of the priority,
wherein the video analyzer analyzes videos acquired when the priority exceeds a predetermined threshold among the outside-vehicle-videos in descending order of the priority.

2. A video data collection and analysis device comprising
a sensor value input interface to acquire a sensor value for a vehicle from a sensor mounted on the vehicle;
a video input interface to acquire an outside-vehicle-video obtained by imaging an outside of the vehicle;
a vehicle external communicator to communicate with an external server;
an abnormality degree evaluator to determine an abnormality degree of a road on which the vehicle travels from a sensor value acquired by the sensor value input interface;
an analysis priority determiner to determine a priority in analyzing the outside-vehicle-video on a basis of the determined abnormality degree;
a video analyzer to analyze a road surface condition of a road appearing in the outside-vehicle-video on a basis of the priority; and
a server information input interface to acquire server information indicating a degree at which the external server is required to acquire the outside-vehicle-video for each type of road abnormality, from the vehicle external communicator, wherein
the analysis priority determiner determines the priority on a basis of the abnormality degree and the server information.

* * * * *